Feb. 22, 1949.    A. H. PEGLOW    2,462,418
JACK ACCESSORY
Filed Dec. 9, 1944

INVENTOR.
ALBERT H. PEGLOW
BY
Christian R. Nielsen
ATTORNEY.

Patented Feb. 22, 1949

2,462,418

UNITED STATES PATENT OFFICE 2,462,418

JACK ACCESSORY

Albert H. Peglow, Milwaukee, Wis.

Application December 9, 1944, Serial No. 567,411

2 Claims. (Cl. 254—133)

My invention relates to a jack accessory, and more particularly to an accessory adaptable to the wheel bolt of an automobile or motor vehicle to enable the lifting jack to be placed into position for service.

The object of my invention is to provide a means of utilizing the outer hub bolt of a motor vehicle wheel to apply a device that will furnish a support for any type of conventional lifting jack, thereby aiding and assisting the user in raising the vehicle and eliminating the difficulties experienced in placing the jack below the automobile or vehicle, especially in mud or snow, thereby simplifying the changing of a tire.

The device is of a single simple construction adaptable to various sizes of wheels, can be made to utilize one or more wheel bolts for support, and affords a safe means of lifting a vehicle.

Other and further objects of my invention will become more apparent as the description proceeds, when taken in conjunction with the drawings, in which.

Figure 1:
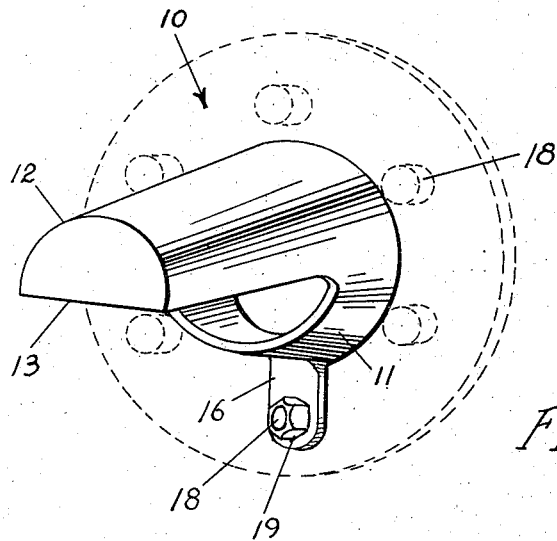
Figure 1 is a perspective view of the device attached to the lower bolt of a wheel assembly shown.
Figures 2, 3, 4:
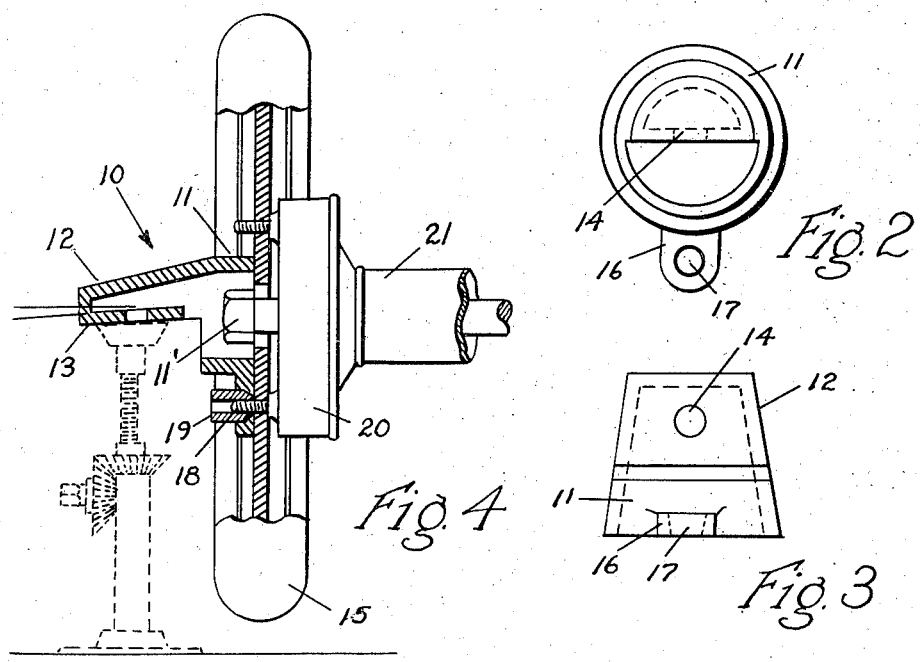
Figure 2 is a front view of the device.
Figure 3 is a bottom view of the device as shown in Figure 2.
Figure 4 is a fragmentary cross sectional view of the device applied to a wheel and showing a lifting jack in phantom.

Similar characters of reference indicate corresponding parts throughout the several views, and referring now to the same, the character 10 shows the main body of the device which may be constructed of a casting, a forging or a stamping, the shape and contour to comply with the material used in its construction. The body 10 consists of a hollow cylindrical portion 11 disposed for receiving the hub 11' of the wheel, and an outwardly extending member 12 shown radial at its top and having a flat face surface 13 at its bottom. The flat surface 13 is provided with an aperture 14 to accommodate an extending lug with which some lifting jacks are provided.

Attention is also called to the fact that the outwardly extending member 12 is angularly disposed at its flat face 13, it being lower at its outer end when attached to accommodate the variation in angle of the axle when a tire is flat, and to permit the wheel to be raised high enough to clear the bottom of the tire 15 off the ground. The flat face 13 is disposed at a point above the center of the wheel.

At the lower periphery of the hollow cylindrical portion 11 is shown a downwardly extending member 16 which is provided with an aperture 17 to accommodate the lower wheel stud 18 and permit the engagement of the conventional nut 19. Obviously, the member 16 may be made wide enough to accommodate two or more of the studs 18, in which case it would become necessary to provide the member 16 with a corresponding number of apertures 17.

In operation, the device functions as follows:

The user when replacing a tire removes the conventional hub cap and fastens the device over the hub of the wheel by removing the nut on the lower stud and securing the nut 19 again as shown. Any conventional type of lifting jack may then be applied under the flat surface 13 and the car raised to a point whereby the tire clears the road or pavement. All this is done on the outer side of the wheel without having to place a jack or the like below the car. After the vehicle is raised to a predetermined height, a satisfactory block may be placed below the brake drum 20 or the axle 21 and the jack removed. The device is then taken off and all the nuts removed from the wheel studs leaving the wheel free to be removed for replacing the tire. The distinct advantage afforded by the device is the elimination of the necessity of getting below the vehicle during the raising operation.

The device is constructed of a single piece of metal, has no moving parts or loose parts to be assembled, and is convenient to carry in any tool compartment. Furthermore, its design permits its being constructed at a minimum cost and this economic feature places it within a price range for the average motorist.

Having thus described my invention, what I claim and desire to secure by Letters Patent in the United States is:

1. A device of the character described comprising a cylindrical body open at one end and having an extended tapered portion, said tapered portion having a flat horizontal face adapted to be engaged by a jack device, and said cylindrical body further having a right angularly disposed member, said member being provided with an aperture positioned so as to align with the lowermost stud of a vehicle wheel for securement thereto.

2. A device of the character described comprising a hollow body open at one end and having an extended tapered portion at the other end, said tapered portion having a flat horizontal face extending inwardly toward the open end of said body, adapted to be engaged by a jack device, said face being positioned above the center of said open end, said hollow body further having an integral right angularly disposed member, said member being provided with an aperture positioned so as to align with the lowermost stud of a vehicle wheel for securement thereto.

ALBERT H. PEGLOW.

REFERENCES CITED

The following references are of record in the file of this patent:

UNITED STATES PATENTS

| Number | Name | Date |
| --- | --- | --- |
| 1,266,958 | Kiriyama | May 21, 1918 |
| 1,658,451 | Long | Feb. 7, 1928 |
| 1,750,663 | Dart | Mar. 18, 1930 |
| 2,063,060 | Sheetz | Dec. 8, 1936 |
| 2,239,729 | Mizer | Apr. 29, 1941 |

FOREIGN PATENTS

| Number | Country | Date |
| --- | --- | --- |
| 19,180 | Australia | 1934 |